United States Patent
Borrell

(10) Patent No.: US 8,943,955 B2
(45) Date of Patent: Feb. 3, 2015

(54) SHELLING-SEPARATING MACHINE ESPECIALLY FOR ALMONDS AND OTHER SOFT-SHELLED NUTS

(75) Inventor: Jose Vicente Roig Borrell, Denia (ES)

(73) Assignee: Jose Borrell S.A. (ES)

( * ) Notice: Subject to any disclaimer, the term of this patent is extended or adjusted under 35 U.S.C. 154(b) by 1064 days.

(21) Appl. No.: 12/331,859

(22) Filed: Dec. 10, 2008

(65) Prior Publication Data

US 2009/0301320 A1 Dec. 10, 2009

(30) Foreign Application Priority Data

Jun. 6, 2008 (ES) .................................. 200801242

(51) Int. Cl.
*A47J 43/00* (2006.01)
*A23N 5/00* (2006.01)

(52) U.S. Cl.
CPC ..................................... *A23N 5/008* (2013.01)
USPC .......................................................... 99/575

(58) Field of Classification Search
USPC .................................................. 99/568–572
See application file for complete search history.

(56) References Cited

U.S. PATENT DOCUMENTS

| | | | | |
|---|---|---|---|---|
| 397,863 A * | 2/1889 | Kuhlmann | .................. | 99/578 |
| 567,372 A * | 9/1896 | Beach | .................. | 99/569 |
| 611,765 A * | 10/1898 | Beach | .................. | 99/634 |
| 644,485 A * | 2/1900 | Woodson | .................. | 99/577 |
| 659,801 A * | 10/1900 | Read | .................. | 99/628 |
| 879,696 A * | 2/1908 | Trevor | .................. | 99/574 |
| 928,958 A * | 7/1909 | Gilson | .................. | 99/569 |
| 1,062,742 A * | 5/1913 | Siebert et al. | .................. | 99/572 |
| 1,073,165 A * | 9/1913 | Paul | .................. | 99/576 |
| 1,133,121 A * | 3/1915 | Gebhardt | .................. | 99/572 |
| 1,230,001 A * | 6/1917 | Martenette | .................. | 99/625 |
| 1,231,002 A * | 6/1917 | Dawson | .................. | 99/536 |
| 1,238,238 A * | 8/1917 | Williams | .................. | 99/570 |
| 1,272,803 A * | 7/1918 | Hayes et al. | .................. | 99/579 |
| 1,322,300 A * | 11/1919 | Gooding et al. | .................. | 99/625 |
| 1,342,692 A * | 6/1920 | Pape | .................. | 99/575 |
| 1,350,506 A * | 8/1920 | Kennedy | .................. | 99/516 |
| 1,364,083 A * | 1/1921 | Demerath | .................. | 99/625 |
| 1,380,023 A * | 5/1921 | Roussillon | .................. | 99/575 |
| 1,380,859 A * | 6/1921 | Baker, Jr. et al. | .................. | 426/482 |
| 1,411,177 A * | 3/1922 | Mitchell | .................. | 99/570 |
| 1,417,272 A * | 5/1922 | Maness | .................. | 99/580 |

(Continued)

FOREIGN PATENT DOCUMENTS

ES 1062979 8/2006

*Primary Examiner* — Alvin Hunter
(74) *Attorney, Agent, or Firm* — St. Onge Steward Johnston & Reens LLC

(57) ABSTRACT

A shelling-separating machine for almonds and other soft-shelled nuts is provided incorporating operational and functional features which ensure the obtaining of the kernel in optimal conditions, while at the same time allowing for an effective separation of the almonds and other hard-shelled nuts that may accompany the soft-shelled nuts. At the inlet end, the machine provides a device for continuously feeding the product for the purpose of eliminating obstructions inside such machine. At the outlet end, the machine provides a retaining device which can be manually or automatically actuated and which keeps the outlet closed in order to retain the non-shelled product until the operational conditions recommend the actuation and opening of such retaining device to allow the non-shelled product to exit the machine, preferably by the overflow with respect to a previously established level.

12 Claims, 2 Drawing Sheets

(56) References Cited

U.S. PATENT DOCUMENTS

| | | | | |
|---|---|---|---|---|
| 1,418,840 A * | 6/1922 | Smith et al. | | 99/514 |
| 1,478,869 A * | 12/1923 | Cooper | | 99/569 |
| 1,501,259 A * | 7/1924 | Woodson | | 99/568 |
| 1,574,450 A * | 2/1926 | Skinner et al. | | 99/569 |
| 1,594,702 A * | 8/1926 | Williams | | 426/483 |
| 1,598,053 A * | 8/1926 | Coari | | 99/569 |
| 1,598,076 A * | 8/1926 | Galleazzi | | 99/578 |
| 1,606,226 A * | 11/1926 | Hopkins et al. | | 99/575 |
| 1,663,980 A * | 3/1928 | Giesecke | | 99/577 |
| 1,672,443 A * | 6/1928 | Williams | | 99/569 |
| 1,761,823 A * | 6/1930 | Gebhardt | | 99/492 |
| 1,767,917 A * | 6/1930 | Demek | | 99/580 |
| 1,785,328 A * | 12/1930 | Repp | | 99/575 |
| 1,795,476 A * | 3/1931 | Coari | | 209/688 |
| 1,802,294 A * | 4/1931 | Walker | | 99/576 |
| 1,808,104 A * | 6/1931 | Gebhardt | | 209/617 |
| 1,834,347 A * | 12/1931 | Nixon | | 99/579 |
| 1,860,746 A * | 5/1932 | MacDougall | | 99/582 |
| 1,935,385 A * | 11/1933 | Biggs | | 99/516 |
| 1,994,906 A * | 3/1935 | Burgin | | 99/569 |
| 2,175,425 A * | 10/1939 | Berneike | | 99/581 |
| 2,248,327 A * | 7/1941 | Bainer et al. | | 99/451 |
| 2,248,365 A * | 7/1941 | Leonard et al. | | 426/482 |
| 2,248,368 A * | 7/1941 | Low | | 99/533 |
| 2,259,939 A * | 10/1941 | Garcia | | 99/570 |
| 2,265,588 A * | 12/1941 | Walker | | 99/569 |
| 2,279,987 A * | 4/1942 | Guerra | | 99/569 |
| 2,296,088 A * | 9/1942 | Carter | | 99/578 |
| 2,307,656 A * | 1/1943 | Abbott | | 99/569 |
| 2,319,757 A * | 5/1943 | Vigneau | | 99/569 |
| 2,321,795 A * | 6/1943 | Buckman | | 99/575 |
| 2,381,288 A * | 8/1945 | Jones | | 99/571 |
| 2,408,510 A * | 10/1946 | Feldmann | | 99/579 |
| 2,424,022 A * | 7/1947 | Deutsch | | 99/569 |
| 2,454,660 A * | 11/1948 | Leonard | | 99/576 |
| 2,504,374 A * | 4/1950 | Baldwin | | 99/569 |
| 2,506,848 A * | 5/1950 | Turner | | 99/569 |
| 2,669,268 A * | 2/1954 | Meyer | | 99/569 |
| 2,685,312 A * | 8/1954 | Mulvany et al. | | 99/451 |
| 2,747,635 A * | 5/1956 | Kofoid | | 426/244 |
| 2,755,834 A * | 7/1956 | Mulvany | | 99/451 |
| 2,762,410 A * | 9/1956 | Stahl | | 99/581 |
| 2,771,927 A * | 11/1956 | Thaning | | 426/241 |
| 2,806,501 A * | 9/1957 | Van Dijk | | 426/482 |
| 3,276,495 A * | 10/1966 | Calfee | | 99/468 |
| 4,144,805 A * | 3/1979 | Cacho | | 99/568 |
| 4,358,467 A * | 11/1982 | Patel | | 426/237 |
| 4,504,505 A * | 3/1985 | Rodriguez et al. | | 426/482 |
| 4,537,122 A * | 8/1985 | George | | 99/516 |
| 4,742,686 A * | 5/1988 | Cook | | 62/64 |
| 4,773,323 A * | 9/1988 | Frasch et al. | | 99/569 |
| 5,467,700 A * | 11/1995 | Dowell et al. | | 99/570 |
| 5,505,123 A * | 4/1996 | Kim | | 99/579 |
| 5,721,002 A * | 2/1998 | Whaling | | 426/482 |
| 6,098,530 A * | 8/2000 | Hemry | | 99/575 |
| 6,135,020 A * | 10/2000 | Broyles | | 99/569 |
| 6,209,448 B1 * | 4/2001 | Hagen | | 99/575 |
| 6,270,824 B1 * | 8/2001 | Quantz | | 426/482 |
| 6,382,427 B1 * | 5/2002 | Nakhei-Nejad | | 209/700 |
| 6,397,737 B1 * | 6/2002 | Eisel | | 99/571 |
| 6,516,714 B2 * | 2/2003 | Warmack et al. | | 99/574 |
| 6,541,057 B1 * | 4/2003 | McSwain | | 426/482 |
| 8,273,396 B1 * | 9/2012 | Shepard et al. | | 426/478 |

* cited by examiner

SHELLING-SEPARATING MACHINE ESPECIALLY FOR ALMONDS AND OTHER SOFT-SHELLED NUTS

CROSS-REFERENCE TO RELATED APPLICATIONS

The present application claims priority from Spanish Utility Model No. 200801242 filed on Jun. 6, 2008, the content of which is incorporated herein by reference.

FIELD OF THE INVENTION

The present invention relates to a shelling-separating machine, especially for almonds and other soft-shelled nuts, providing essential novelty features and considerable advantages with respect to the means known and used for similar purposes in the current state of the art.

BACKGROUND OF THE INVENTION

The existence of multiple nuts in which the kernel, i.e., the part which can be used for consumption, is covered with a shell with a degree of hardness which varies considerably among nuts is generally known. Even within the same nut, there are occasionally different varieties nuts in which the degree of hardness of a shell is likewise variable. Such is the case of almonds, in which the degree of hardness of the shell varies considerably from one variety to another. Therefore, the shelling process must necessarily be designed according to the structural features of the shell.

The existence of machines which have specifically been designed to automatically shell the almonds or other nuts with similar characteristics is already known on the market. For example, Spanish Utility Model number U-200601131 owned by the same applicant as the present invention and incorporated herein by reference describes a shelling-separating machine for almonds in which the shelling element consists of a rotary shaft provided with multiple filiform elements which, like fingers longitudinally provided with a certain curvature, project radially from said rotary shaft, starting from aligned positions according to different generatrices of the rotary shaft. These elements act directly on the shell of the nut and cause it to break, in order to extract the kernel through an outlet hopper provided for such purpose, and to expel the sticks and shells through an outlet mouth located at the end opposite to the product access end.

However, experience has demonstrated that in practice, soft-shelled almonds are usually mixed with a certain percentage of hard-shelled almonds, which is about 10% to 20%. These hard-shelled almonds evidently require a different treatment, as it is impossible to break their shell to extract the kernel with the use of the same machine as is used for the softer-shelled almonds.

Therefore, although the machine described in the mentioned prior utility model perfectly fulfills the mission for which it was developed, it has been verified in practice that the modification of some of the structural features for the purpose of providing continuous feed means, together with retaining the hard-shelled almonds (i.e., the non-shelled nuts) at the outlet of the machine, all of this being controlled by measuring and controlling a certain functional parameter, allows carrying out a selection of soft-shelled almonds among hard-shelled almonds, in order to extract the kernel from the first type of almonds and expel the second type of almonds, when certain levels of the control parameter are exceeded, the expelling action of which can be manually or automatically controlled.

SUMMARY OF THE INVENTION

Therefore, the objective of the present invention is to develop and construct an almond shelling machine which allows obtaining the operational and functional improvements mentioned above. This objective has been fully reached by means of the shelling machine which will be the object of the description below.

The machine of the invention has essentially started from a basic construction similar to that described in the above-mentioned prior utility model, in the sense that the machine comprises a receptacle supported by a suitable support frame intended to receive the nuts through an access mouth located at a first end of the receptacle, the latter being provided with an opening made at the bottom thereof, in a longitudinally intermediate position, for the exit of the kernel, and the receptacle further having an outlet mouth formed at the other end through which the almonds or harder-shelled nuts which have not been shelled, together with other impurities, are expelled. Inside the receptacle there is a rotary shaft, supported on end bearings, provided with radially projecting fingers to act on the almonds and drive the relative movement thereof towards the outlet mouth formed at the second end of the receptacle.

Unlike the machine of the prior document, the present invention has provided the arrangement at the inlet of the machine of a hopper equipped with a vibrating/feed metering device, which prevents the machine from being without material and the breaking of the kernel with the subsequent reduction in the quality of the latter, whereas the continuous feed provided by said device prevents at the same time the occurrence of obstructions inside the machine. In turn, the placement of a lowerable means intended to close the outlet opening has been provided at the outlet mouth of the machine of the present embodiment, such that the non-shelled product (almonds or other hard-shelled nuts) is retained for the necessary time, until the operational conditions of the machine show the need to open the retaining element to allow the exit of the retained product. As has been stated, these conditions are determined by controlling one or more functional parameters of the machine, such that the action for opening the retaining element can be carried out manually or automatically. In the embodiment of the present invention, it has been provided the retained product exits due to overflowing, once the amount of retained product exceeds a certain pre-established level, given that as hard-shelled almonds have a lower density than soft-shelled almonds, they occupy the highest positions in the stack of retained product. Despite the foregoing, although overflowing is preferred as the expelling means for the hard-shelled almonds in the chosen embodiment, it must be understood that in the state of the art there are many other options which would be perfectly applicable to the improved machine of the present invention for the purpose of recovering the almonds or other harder-shelled nuts which may not have shelled during their passage through the machine.

As a constructive detail associated to the improvements proposed by the present invention, it has been provided that the motor in charge of transmitting the driving action on the rotary shaft inside the receptacle of the machine is preferably located in a position outside the frame, far from the lower outlet of the receptacle through which the shelled kernel falls, thus providing it with a greater protection against the dust which inevitably accompanies the kernel. Additionally, and independently, of the position chosen for said motor, the machine can incorporate aspiration means which aspirate and collect a high percentage of the dust generated during the treatment of the nuts inside the receptacle of the machine, for the purpose of preventing the dust generated from being accumulated in the motor or any other member of the machine.

The motor transmitting the driving effect to the rotary shaft is preferably controlled electronically, such that its speed is variable through a wide range of value, for the purpose of adapting the speed of the rotary shaft (and therefore the action of the fingers on the nuts) to the process conditions, either during the filling (feed of the product towards the receptacle) or to adapt the speed according to the type or the variety of nuts which are being shelled.

As it will be understood, with a shelling-separating machine including the constructive improvements mentioned above, a much more complete treatment of soft-shelled almonds is achieved, while at the same time a much more profitable result is ensured due to considerable reduction in the percentage of non-shelled almonds with respect to that which was generated with prior machines, with the subsequent production increase. The form of control of the shelling provided does not affect the kernel, and a substantial improvement over the entire process is therefore obtained.

BRIEF DESCRIPTION OF THE DRAWINGS

These and other features and advantages of the invention will be more clearly shown from the following detailed description of a preferred embodiment, given only by way of a non-limiting illustration together with the attached drawings, in which.

DETAILED DESCRIPTION OF THE INVENTION

The present invention proposes the development and construction of a machine applicable to the operation of shelling nuts of the type of those including a soft (and where appropriate semi-soft) outer enveloping shell, such as almonds, peanuts and other nuts the shell of which has hardness, flexibility and tenacity properties similar to those of the specifically mentioned nuts, which machine has been designed as a substantial improvement of the already existing models as it incorporates operational and functional features which allow ensuring the obtaining of the kernel in optimal conditions, while at the same time it allows an effective separation of the almonds and other hard-shelled nuts which may possibly accompany the soft-shelled nuts. The machine of the invention provides, on one hand, the incorporation at the inlet end of the machine of means for continuously feeding the product for the purpose of eliminating obstructions inside such machine and, on the other hand, at the outlet end of the machine, retaining means which can be manually or automatically actuated, which means keep the outlet closed in order to retain the non-shelled product until the operational conditions recommend the actuation and opening of such retaining means to allow the non-shelled product to exit the machine, preferably by the overflow with respect to a previously established level.

Figure 1:
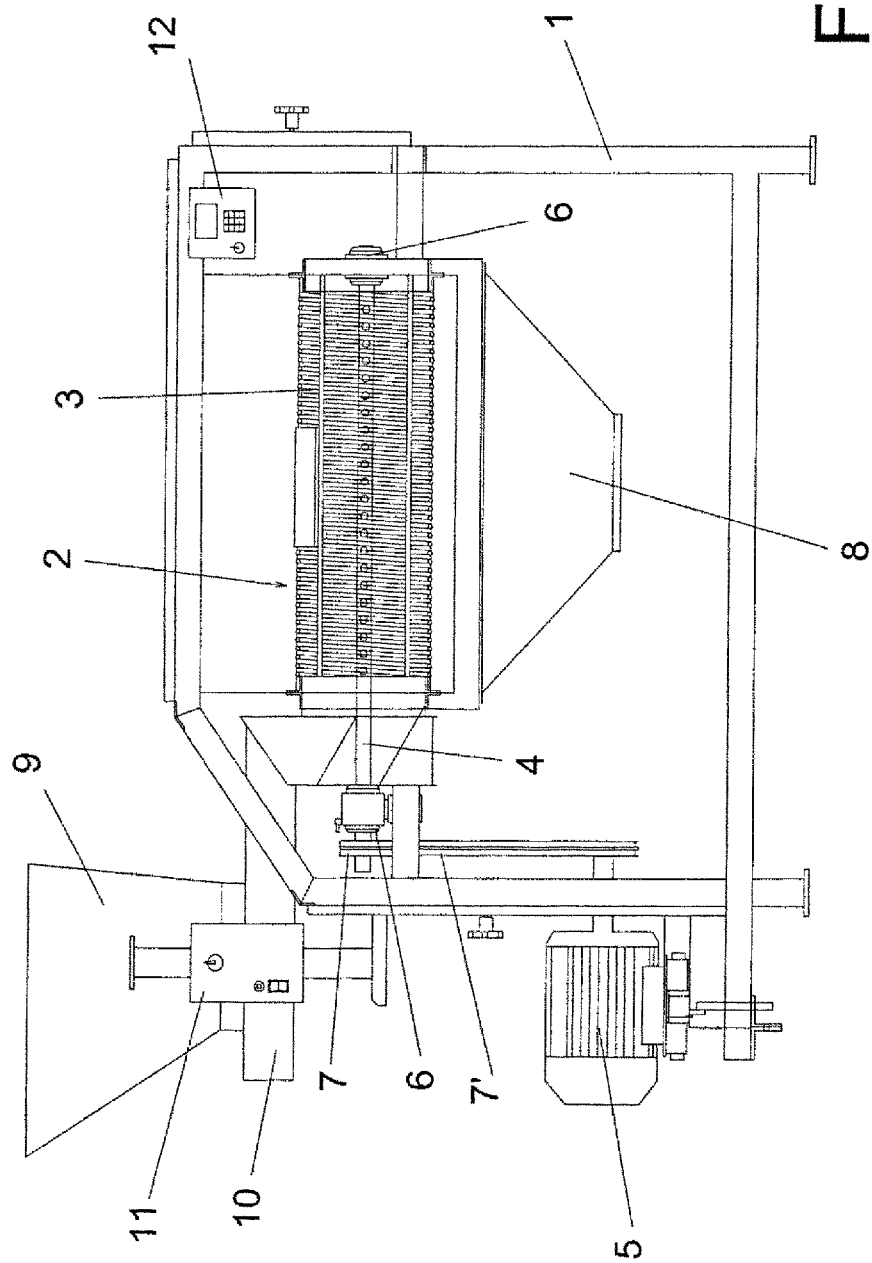
FIG. 1 is a schematic side elevational view of a shelling machine for almonds or other soft-shelled nuts, incorporating the changes and improvements proposed by the present invention.

As has been mentioned above, the detailed description of the preferred embodiment of the machine of the invention will be made below with the aid of the attached drawings, through which the same reference numbers are used to designate identical or similar parts. Thus, considering first FIG. 1, it shows a schematic side elevational representation of a shelling machine, in which the side protectors have been removed to expose the different elements integrating it. The machine is structured on a frame 1 supporting the entire assembly, in which there is assembled a housing or receptacle 2 formed by multiple rods 3, on which the nuts to be shelled are fed and against which they are pressed during the action for breaking the shell. Inside the receptacle 2 there is a cylindrical shaft 4, longitudinally extended along the receptacle, supported on a bearing 6 at each of its ends, provided with radially projecting elements like fingers (see FIG. 2 of the aforementioned document U-200601131), said fingers being in charge of acting on the almonds or other nuts upon being driven by the rotational movement of the shaft and breaking the shells as a result of the friction that they exert on the outer surface thereof. The rotational movement of the shaft is caused by a motor 5, from which the driving action is transmitted to a pulley 7 with the aid of an intermediate transmission such as a belt 7' or the like. The receptacle 2 has an access mouth for the product to be shelled formed at a first end thereof, to which a hopper 9 is applied, which hopper is provided with a vibrating and/or metering device indicated with reference number 10 whereby the product is directly introduced inside the receptacle 2 and is driven towards the area of the fingers of the shaft 4. The kernel obtained once the almonds or other soft-shelled nuts have been shelled is collected through the hopper 8 coupled to the lower part of the receptacle and located below the latter, whereas the thrust exerted on the hard-shelled almonds or other impurities makes them move towards the opposite end of the machine, where they are retained as will be seen in relation to FIG. 2. The machine includes electric/electronic control and command elements, graphically indicated with reference numbers 11, 12, on which the operator acts according to the specific needs.

Figure 2:
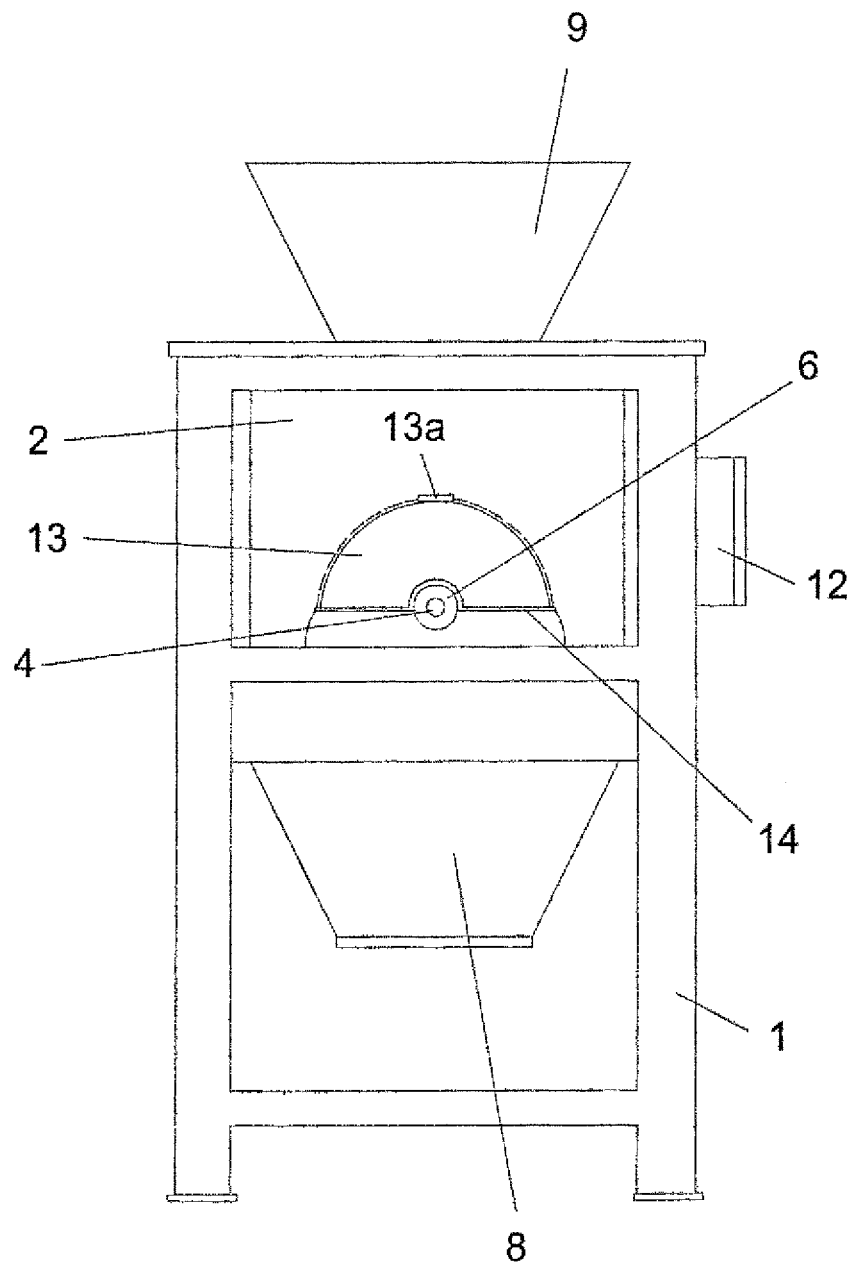
FIG. 2 is a schematic elevational view, taken from the second end of the shelling machine.

Now considering the representation of FIG. 2, it shows an illustrative elevational view taken from the outlet end of the machine. In this representation, the outlet mouth is shown formed by a semicircular opening formed at the second end of the receptacle 2, above a level 14, and closed by a retaining element 13 provided with releasable locking means, such as a suitably configured and sized planar plate or the like which can be lowered, for example with respect to a hinged joint 13*a* with a higher positioning.

With a machine embodiment such as that which has just been described, both the operation of the machine and the improvements provided by the invention with respect to other conventional machines can be easily understood. The product is introduced through the hopper 9, with the aid of the vibrating and metering device 10, towards the receptacle 2, where it is subjected to the shelling action provided by the fingers of the shaft 4. The feed of a sufficient amount of product makes this action effective, as it is basically the consequence of the friction between the fingers and the almonds inside the receptacle. The almonds which are not shelled, together with other impurities, are thrust towards the end of the receptacle opposite to the inlet end, where they have no chance of exiting because the retaining element 13 is lowered, i.e., closing the outlet passage, and they are therefore retained against such element. When it is considered that there is retention above a predetermined threshold, which circumstance depends on the parameters measured by the devices 11 and/or 12, the opening of the retaining element 13*a* is caused, allowing the product which was retained up to that time to exit. As has been stated, this product basically consists of the hard-shelled almonds which were accumulated during the development of the process and which correspond to a percentage of almonds which normally accompanies the soft-shelled almonds, mixed with the hard-shelled almonds, and which as result of its lower density, occupies higher positions in the stack of the product; in the embodiment which has been shown, the fall occurs due to the overflowing of the amount of almonds which has been located above the edge determined by line 14, these almonds being suitably collected for their subsequent treatment in another suitable machine.

In the description which has just been made, it has been considered that the soft-shelled almonds are mixed with a percentage amount of hard-shelled almonds as this is the normal situation occurring in practice. However, the persons skilled in the art will understand that the improvements provided by the modified machine of the present invention can also be reached even in the case in which there are no hard-shelled almonds mixed with the soft-shelled almonds, but rather the entire treated product is of the latter type. Indeed, due to the fact that, as has been stated above, the shelling occurs by the friction between the fingers (not visible in the figure) carried by the rotary shaft 4 and nuts fed into the receptacle 2, it will be understood that this action is optimized when a minimum product filling level has been reached inside said receptacle 2, which is obtained as a result of the feed controlled through the vibrating/metering device 10 incorporated at the inlet of the receptacle. This action is independent of the existence or non-existence of hard-shelled almonds or other nuts retained at the outlet, because as has been stated, the optimal performance is achieved when a minimum filling level is reached; it is deduced therefrom that although all the almonds are soft-shelled almonds, the results are likewise improved provided that this minimum filling level is maintained approximately constant.

Continuing with the description of the operational development of the treatment process, as the non-shelled product is allowed to exit receptacle 2 by lifting the retaining element 13, the variation in the measured parameters determines that the closure of said retainer 13 is carried out again, the cycle continuing in the same manner.

The parameter used to determine the action of the retaining element 13 is preferably the driving torque associated with the motor device 5, which is variable depending on the higher or lower resistance found by the rotary shaft 4 during the operational cycle, but this feature must not be considered as limiting, since any other parameter which can provide information on the operational and functional states of the machine could be chosen. In this sense, other parameters such as power consumption, the product level detected by means of a suitable probe, the speed of the rotary shaft, or even the offset measured in the amount of inlet and outlet product could be mentioned.

In addition, as has been mentioned above, the lowering of the retaining element 13 of the present embodiment with respect to its hinged joint 13a in relation to the receptacle 2 can be carried out manually by the operator in charge of the machine, or it can be carried out in an automated manner, commanded by the control devices, with the use of any means known in the art and which are suitable for this specific function, depending on the measured values of the parameter considered.

Finally, it will be observed that the motor 5 is positioned outside of the frame 1 for supporting the machine. This feature must only be understood as optional and is due to the convenience of separating the motor 5 from the outlet of the hopper 8 because, as has been stated, the shelled kernel exiting through said hopper 8 is accompanied by a certain amount of dust which reaches the position of the motor 5, is accumulated thereon, increases the maintenance needs and reduces its operational life. Therefore, it is considered necessary to locate it in a position farther from the outlet of the hopper 8, and therefore less within the reach of the dust which is produced during the shelling and exiting to the outside together with the kernel. Alternatively, the machine can include a conventional type of aspirating device (not shown) which allows suitably aspirating the dust which is produced during the operations for treating the nuts inside the receptacle 2, regardless of the fact that the motor is located outside the frame as has been shown in FIG. 1 of the present embodiment, or that the motor occupies a certain position in the inner space of the frame as occurs in conventional machines.

As a summary of the above, it will be understood that the described machine provides a set of advantages with respect to currently existing machines, because the feed through the hopper and the metering device is more safe and effective as, on one hand, it prevents the machine from being without material and, consequently, the breaking of the kernel, with the subsequent reduction in the quality thereof, and, on the other hand, it provides a continuous controlled feed which keeps a filling level constant, preventing the occurrence of obstructions and allowing reaching an optimal performance of the machine; the placement of a retaining element at the outlet end improves the percentage of non-shelled almonds which occurred with the production increase, and finally, the arrangement of the motor outside the frame, in the case of the preferred embodiment of the invention, reduces the need and frequency of maintenance operations, with the subsequent saving of time and costs. All this, together with the capacity for the automated control of its operation, makes the described machine have optimal operational and functional features for the function for which it is intended.

It is not considered necessary to extend the content of the present description so that a person skilled in the art can understand its scope and the advantages derived therefrom, as well as carry out the practical embodiment of its object.

Despite the foregoing and given that the description made corresponds only to a preferred embodiment, it will be understood that multiple, likewise protected variations and modifications of detail could be introduced within its essence, which could affect features such as the shape, the size or the construction materials of the assembly or of the parts integrating it.

What is claimed is:

1. A shelling-separating machine for almonds and other soft-shelled nuts, with the controlled separation and extraction of the percentage of hard-shelled almonds which are usually mixed with soft-shelled almonds, the machine comprising:

a receptacle supported by a frame for receiving the almonds to be treated, said receptacle comprising an access mouth positioned at a first end of said receptacle, a first outlet opening positioned at an opposite end of said receptacle, and a second outlet opening coupled to a lower hopper for collecting the kernel already separated from the shell;

a rotary shaft longitudinally extended inside the receptacle and provided with a plurality of filiform elements distributed along a length of the rotary shaft and frictionally interacting with the almonds to break the shell and extract the kernel, said rotary shaft being supported by bearings coupled to each of respective ends of said rotary shaft and being rotationally driven by a pulley and a belt driven from a motor;

an assembly of product feed means formed by a hopper and a vibrating/metering device coupled to an inlet mouth, and with an action controlled through command means based on values reached by a measurement of a level of a parameter related to operational and functional features of the machine, such that the assembly of product feed means carry out a continuous, controlled feed maintaining a constant filling level inside the receptacle;

a measuring device that measures a driving torque associated with the motor; and a retaining element provided with releasable locking means, coupled to the first outlet opening of the receptacle, wherein said retaining element operates based at least in part on the driving torque associated with the motor and maintains said first outlet opening in a closed condition with a subsequent product retention which allows reaching a desired constant level, until the measured driving torque reaches a value exceeding a predetermined threshold, at which time said retaining element is released and pivoted, by a manual or automated action, with respect to a joint which is hinged with a structure of said receptacle.

2. The machine according to claim 1, wherein the motor transmitting movement to the rotary shaft is located in a position outside the supporting frame, far from the outlet opening of the lower hopper.

3. A shelling-separating machine for almonds and other soft-shelled nuts, comprising:

a receptacle comprising an access mouth positioned at one end of the receptacle for receiving the nuts to be treated, a first outlet opening positioned at an opposite end of the receptacle, and a second outlet opening coupled to a lower hopper for collecting kernel separated from nut shell;

a rotary shaft longitudinally extended inside the receptacle and provided with a plurality of filiform elements distributed along a length of the rotary shaft for frictionally interacting with the nuts, wherein said rotary shaft is actuated by a motor;

a measuring device that measures a driving torque associated with the motor; and a retaining element coupled to the first outlet opening of the receptacle and provided with releasable locking means for maintaining the first outlet opening in a closed position; and a controller that maintains the first outlet opening in a closed position via the retaining element until the driving torque measured by the measuring device reaches a value exceeding a predetermined threshold value.

4. The machine according to claim 3, further comprising a product feed assembly coupled to the access mouth of the receptacle.

5. The machine according to claim 4, wherein the product feed assembly comprises a hopper and a vibrating and/or metering device.

6. The machine according to claim 5, wherein operation of the product feed assembly is controlled via a controller based on measurement of at least one parameter related to operational and functional features of the machine, such that a constant filling level inside the receptacle is maintained.

7. The machine according to claim 3, further comprising a motor positioned outside of a machine frame and coupled to the rotary shaft.

8. The machine according to claim 3, wherein the retaining element maintains the first outlet opening of the receptacle in the closed position with a subsequent product retention until a measured parameter reaches a value exceeding a predetermined threshold value, at which time the retaining element is opened allowing the nut product to exit the receptacle via the first outlet opening.

9. A method for shelling and separating nuts, comprising the steps of:

feeding nuts to be shelled into a receptacle via an inlet mouth provided at a first end of the receptacle, wherein the receptacle further comprises a first outlet opening positioned at a second end of the receptacle and a second outlet opening;

actuating a rotary shaft via a motor, wherein said rotary shaft is longitudinally extended inside the receptacle and provided with a plurality of filiform elements distributed along a length of the rotary shaft to frictionally interact with the nuts to break shells and extract kernels;

receiving the kernels separated from the shells into a lower hopper coupled to the receptacle via the second outlet opening;

measuring a driving torque associated with the motor;

maintaining the first outlet opening in a closed position via a retaining element provided with releasable locking means until the driving torque associated with the motor reaches a value exceeding a predetermined threshold value; and opening the first outlet opening by releasing the retaining element once the threshold value is exceeded to allow the nut product to exit the receptacle via the first outlet opening.

10. The method of claim 9, further comprising the step of controlling the feed of nuts via a product feed assembly coupled to the inlet mouth of the receptacle based on measurement of at least one parameter related to operational and functional features of the machine such that a constant filling level inside the receptacle is maintained.

11. The method of claim 9, wherein the step of opening the first outlet opening is automated.

12. The method of claim 9, wherein the step of opening the first outlet opening is performed manually.

* * * * *